United States Patent [19]

Azarevich et al.

[11] 4,383,427

[45] May 17, 1983

[54] APPARATUS FOR THE MACHINING OF CYLINDRICAL SURFACES

[76] Inventors: Gennady M. Azarevich, ulitsa akademika Yangelya, 14, korpus 2, kv. 257; Jury V. Maximov, ulitsa Lesteva, 18, kv. 36; Boris I. Akimov, Simonovsky val, 7, korpus 1, kv. 249; Iosif A. Gusyatsky, ulitsa Malaya Bronnaya, 10, kv. 35, all of Moscow, U.S.S.R.

[21] Appl. No.: 239,991

[22] Filed: Mar. 3, 1981

[51] Int. Cl.³ .................. B23B 23/00; B24B 39/04
[52] U.S. Cl. .................................... 72/71; 72/80; 29/90 R; 82/31; 82/25
[58] Field of Search .............. 82/20, 25, 31, 34 R; 29/90 R, 90.5, 27 R, 27 C; 72/71, 84, 70, 80, 85

[56] References Cited

U.S. PATENT DOCUMENTS

| 1,635,285 | 7/1927 | Lovely | 82/25 |
| 2,653,503 | 9/1953 | Cormier | 82/31 |
| 3,049,788 | 8/1962 | Martin | 29/90 |

FOREIGN PATENT DOCUMENTS 2240613 3/1975 Fed. Rep. of Germany .
2702396 7/1979 Fed. Rep. of Germany .
305982 9/1971 U.S.S.R. .
428898 1/1975 U.S.S.R. .

OTHER PUBLICATIONS

Article "Combined Tools for Combining Cutting and Surface Deformation Process", P. S. Christoserdov, Moscow, 1975, pp. 20, 21, 27 and 28 (with translation).

Primary Examiner—Lowell A. Larson
Attorney, Agent, or Firm—Fleit, Jacobson & Cohn

[57] ABSTRACT

An apparatus for the machining of cylindrical surfaces on machine tools comprising headstock and tailstock centers to support the work placed therebetween, a tool head, and a head with deforming rollers spaced equidistantly apart in a circumferential direction. The heads are consecutively arranged in a housing fitted to the carriage of a machine tool. A portion of the tailstock center that, in operation, is face to face with the work serves as the guide for the deforming rollers and has a diameter virtually equal to the diameter at which the deforming rollers are set. Its end next to the work is adapted to accommodate the point of the tool in a position preparatory to machining.

10 Claims, 6 Drawing Figures

APPARATUS FOR THE MACHINING OF CYLINDRICAL SURFACES

The present invention relates to the tooling of metal-cutting machine tools and is particularly concerned with apparatus for the machining of cylindrical surfaces.

The disclosed invention is intended for use on lathes which turn shafts, piston rods of hydraulic cylinders, axles, and the like.

Lathes fitted with the disclosed apparatus for the machining of cylindrical surfaces can be employed in the automotive, tractor and agricultural machine industries, in road machinery building, etc.

There is known a apparatus for the machining of outside cylindrical surfaces used in conjunction with metal working lathes. Incorporated therein are headstock and tailstock centers supporting the work placed therebetween, a tool head, and a head carrying deforming rollers. The headstock center is geared to the main motion drive and the tailstock center, supported by rolling contact bearings, is movably linked with the tailstock poppet sleeve.

The tool head and the head with the deforming rollers are consecutively fitted in a housing attached to the lathe carriage. The deforming rollers are contained in a cage and are spaced equidistantly apart in circumferential direction, and interact in operation with both the tapered inside surface of a sleeve and the work (See USSR Inventor's Certificate No. 305 982).

In the known contrivance, the tailstock center is provided in the form of a cylinder with a forward- or rearward converging taper at the end. The diameter of the cylinder is less than that of the work and the deforming rollers are clear of it in the initial position. The turning of a cylindrical surface by the known contrivance is accompanied by chattering, for—at the early stage—the deforming rollers lack contact with the work and cannot function as a follow-rest system. The resulting surface defect spreads out over the workpiece due to the deforming rollers which, passing over the irregularities, profile them and cause the chattering of the tool in operation. The final defective area can thus be four times the initial one. To avoid this, the work must be preturned over a length equal to the distance between the tool point and deforming roller. The preturned diameter must be in excess of the diameter at which the deforming rollers or otherwise the pressure required for the surface rolling are set (or, in other words, the interference) cannot be secured.

The preturning of work requires additional equipment, increasing the requirements for machine tool stock. This, in its turn, calls for an extensive production area. The labor requirements are high as well, for much time is needed to cope with auxiliary operations (positioning and removing work, conveying, etc.).

It is an object of the present invention to increase the precision of machining.

Another object of the present invention is to cut the labour requirements for machining.

A further object of the present invention is to reduce the machine tool stock and, consequently, the extent of production areas.

The essence of the invention is that in a apparatus for the machining of cylindrical surfaces on machine tools having headstock and tailstock centers to support the work placed therebetween, a tool head, and a head with deforming rollers spaced equidistantly apart all the way along a circumference, the heads being consecutively arranged in a housing mounted on the carriage of a machine tool, a length of the tailstock center contiguous in operation face to face with the work and serving as the guide for the deforming rollers is given a diameter virtually equal to the diameter at which the deforming rollers are set and its end facing the work is adapted to accommodate the point of the tool in a position preparatory to machining.

It is expedient that the tailstock center is shaped, at least within the length serving as the guide for the deforming rollers, cylindrically and has an axial blind bore in which a spring-loaded centering cone is contained.

The tailstock in such a form ensures reliable fixing of shafts and effective machining of those which are of a low mass and have an end of a smaller diameter with a central hole.

Not less expedient is that the tailstock center is provided, at least within the length serving as the guide for the deforming rollers, with a spring-loaded cylindrical sleeve and a centering cone contained therein.

The tailstock center with a spring-loaded cylindrical sleeve and a centering cone is used in machining high-mass shafts with a central hole at the end of a smaller diameter. In operation, the tailstock center will be always pressed against the end face of the work due to the action of the spring without a play even if the linear dimensions of the central hole are variable.

It is expedient that the end of the tailstock center which is contiguous with the end face of the work in the course of machining is provided with a chamfer at the outside diameter to accommodate the tool point in its position preparatory to machining.

It is also expedient that the end of the tailstock center which is contiguous with the end face of the work is provided with an annular groove not wider than three millimeters to accommodate the tool point in its initial position preparatory to machining.

It is possible that the tailstock center is given a rearward converging taper and its end contiguous with the end face of the work in the course of machining is provided with either an annular grove not wider than three millimeters or a chamfer at the outside diameter to accommodate the tool point. To provide the chamfer or groove for the tool point is a simple operation requiring no effort.

It is expedient that the end of the cylindrical portion of the tail stock center which is contiguous with the end face of the work is provided with a rearward converging taper.

It is also expedient that the end of the cylindrical sleeve which is contiguous with the end face of the work is provided with a rearward converging taper.

The presence of the rearward converging taper enables the machining of pieces of work which are chamfered at the ends. The use of a chamfer as the datum surface ensures precise positioning of the work with respect to the lathe spindle and, as a result, high accuracy of machining.

It is possible that a length of both the headstock and tailstock centers is given a stiffness which is less than elsewhere, the low-stiffness section of the tailstock center being located behind the length serving as the guide for the deforming rollers.

The provision of the headstock and tailstock centers with low-stiffness sections minimizes the effect of an erroneous setting of the work at the datum surface and of the tailstock and the apparatus as a whole relative to the lathe spindle.

It is expedient that the apparatus is provided with a hydraulic cylinder and the tailstock center is movably linked with the mobile member thereof so as to be capable of axial travel.

This arrangement ensures constant optimum effort for the clamping of the work during machining so as to prevent its slip at the headstock centre and to eliminate the possibility of its bending.

The apparatus for the machining of cylindrical surfaces on a machine tool provided in accordance with the present invention displays operational reliability and enables a surface to be machined in one setup, in spite of being of a comparatively simple construction, without sacrificing quality. A practical implementation of the invention will cut the machine tool stock, reducing thereby the productive area requirements, and increases labor productivity at the same time.

A specific embodiment of the present invention is described hereinafter with reference to the accompanying drawings in which.

Figure 1:
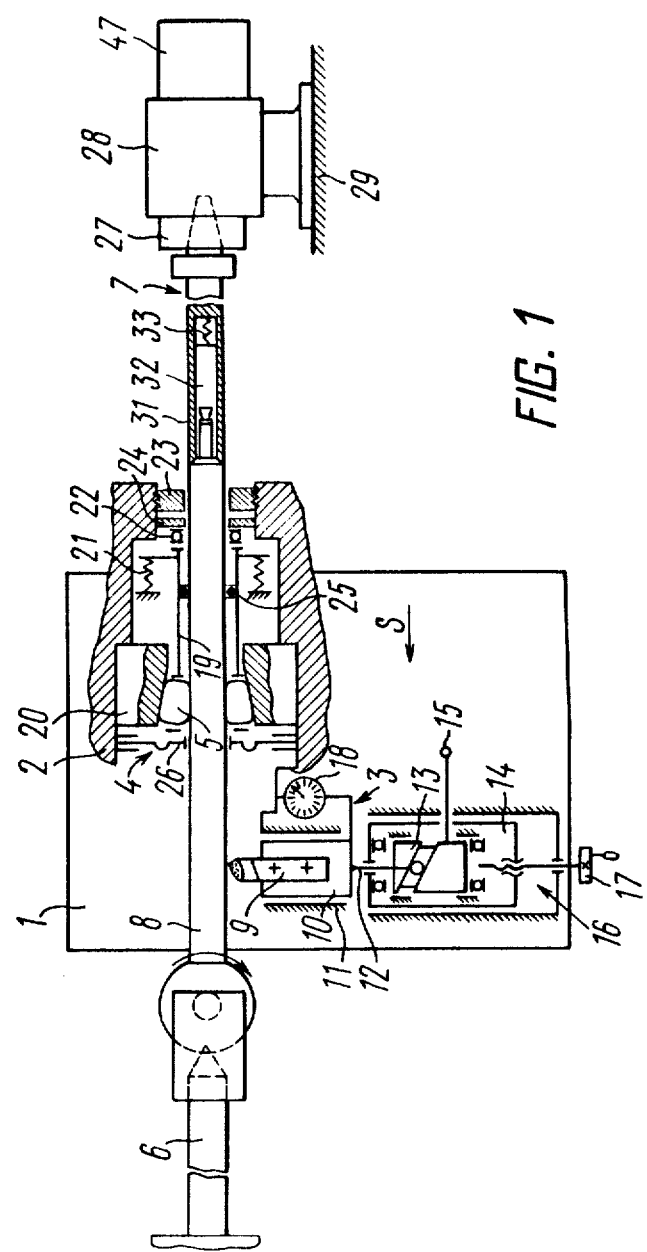
FIG. 1 is a schematic plan view, partly cut away, of a contrivance for the machining of external cylindrical surfaces according to the invention.

The apparatus for the machining of cylindrical surfaces on machine tools comprises a plate 1 (FIG. 1) secured to the carriage (not shown) of a lathe; a housing 2 containing a tool head 3 and a head 4 with deforming rollers 5, the heads being consecutively arranged in the direction of axial feed indicated by arrow S and the housing being secured to the plate 1; a headstock center 6 and a tailstock center 7 serving to support a work 8 placed therebetween for machining.

The tool head 3 accommodates a tool 9 attached to a slide 10 fitting into guides 11 provided in the housing 2. The slide 10 is linked with a drum 13 through a tie rod 12, and the drum can be turned in a supporting slide 14 by means of a handle 15. The drum 13 is provided with a curvilinear groove fitting whereinto is an end of the tie rod 12 and serves the purpose of speedily withdrawing the slide 10 integrally with the tool 9 after machining or advancing the tool 9 preparatory to machining.

The tool 9 is set for a given turning diameter with the aid of a slide 14 which can be actuated by a handwheel 17 through the intermediary of a kinematic pair 16 consisting of a nut and a screw. The setting of the tool 9 is monitored by means of a dial gauge 18 whose input is connected to the slide 10.

The head 4 contains a cage 19 with slots accommodating the deforming rollers 5 which are spaced equidistantly apart all the way along the circumference and rest on a supporting cone 20 fitted inside the housing 2. A spring 21 provided in the housing 2 automatically sets the cage 19 integrally with the deforming rollers 5 at a given turning diameter. The axial loads coming into play during turning are sustained by a thrust bearing 22.

The deforming rollers 5 are set at the given turning diameter wih the aid of a nut 23 which, enaging with its male thread a female thread cut in the housing 2, acts upon a ring 24 also contained in the housing 2.

A ring 25 in an elastic material fitted to the cage 19 serves to prevent leaks of the lubricant-coolant out of the zone of surface rolling. A cover plate 26 at the side of the head 4 facing the tool head 3 keeps chips out of the zone in which the deforming rollers 5 are arranged to operate.

Figure 2:
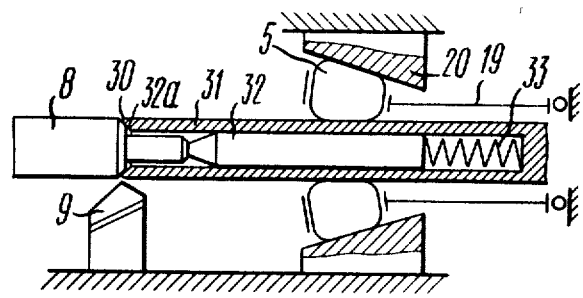
FIG. 2 is a view of the tailstock center with a spring-loaded centering cone, the tool head and deforming rollers set into an initial position.

The tailstock center 7 is of the revolving type and fits into a poppet sleeve 27 of the tailstock 28 resting on the frame 29 of the lathe. The center 7 at some length has, a diameter virtually equal to the diameter at which the deforming rollers 5 are set. Said length should be sufficient to accommodate the housing 2, enabling the tool 9 to be set at the end face of the work 8 as shown in FIG. 2. The tailstock center 7, serving as the guide for the deforming rollers 5, abuts the end face of the work 8, enabling the rollers to contact the work in a gradual way so as to ensure high precision of machining.

To facilitate the setting of the point of the tool 9 into the initial position preparatory to machining, a chamfer 30 (FIG. 2) is provided at the outside diameter of that end of the tailstock center 7 which is contiguous with the work 8.

To cope with the turning of a work 8 which has a low mass and an end of a smaller diameter with a central hole, the tailstock center 7 is provided with a cylindrical portion 31 in a blind bore of which is contained a centering cone 32 acted upon by a spring 33.

The outside diameter of the cylindrical portion 31 is virtually the same as the diameter at which the deforming rollers 5 are set.

To enable the turning of a work 8 which is chamfered at its end face contiguous with the cylindrical portion 31, the latter is provided with a rearward converging taper 32a at its inner diameter.

Figure 3:
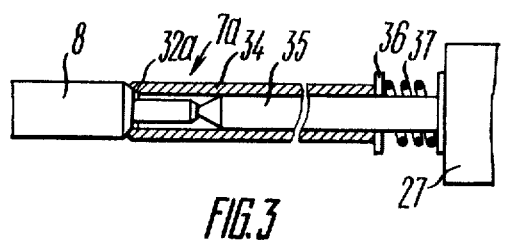
FIG. 3 is a view of the tailstock center with a spring-loaded cylindrical sleeve and a centering cone.

To cope with the turning of a work 8 which has a high mass and an end of a smaller diameter with a central hole, the tailstock center 7a (FIG. 3) is provided with a cylindrical sleeve 34 and a centering cone 35.

The diameter of the cylindrical sleeve 34 is virtually equal to the diameter at which the deforming rollers 5 are set.

A spring 37 serving to press the sleeve 34 against the end face of the work 8 during the turning is fitted to the centering cone 35 between the poppet sleeve 27 and a retainer 36.

Figure 4:
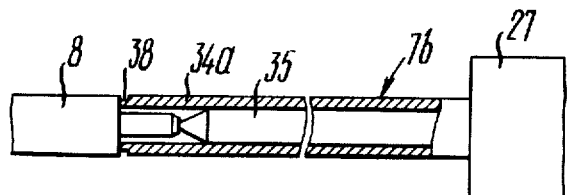
FIG. 4 is a view of the tailstock center in another embodiment.

To facilitate the setting of the point of the tool 9 into the initial position, an annular groove 38 (FIG. 4) is provided at that end of a cylindrical sleeve 34a of the tailstock center, which is contiguous with the end face of the work 8 in the course of turning. By virtue of the width of this groove, which does not exceed three millimeters, the deforming rollers 5 are smoothly transferred from the tailstock center 7b to the work 8.

Figure 5:
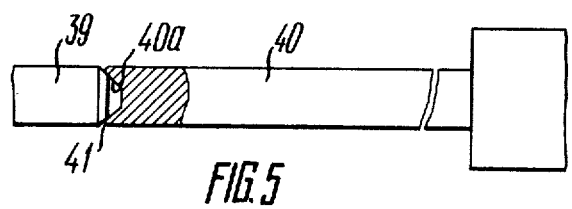
FIG. 5 is a view of the tailstock center with a rearward converging taper.

To enable the turning of a work 39 (FIG. 5) which is only chamfered at an end, a tailstock centre 40 is given a rearward converging taper 40a and is of diameter virtually equal to the diameter at which the deforming rollers 5 are set; a chamfer 41 cut at its end at the outer diameter serves to accommodate the point of the tool 9. Alternatively, an annular groove similar to that described above can be cut at the end of the tailstock center to accommodate the point of the tool 9.

Figure 6:
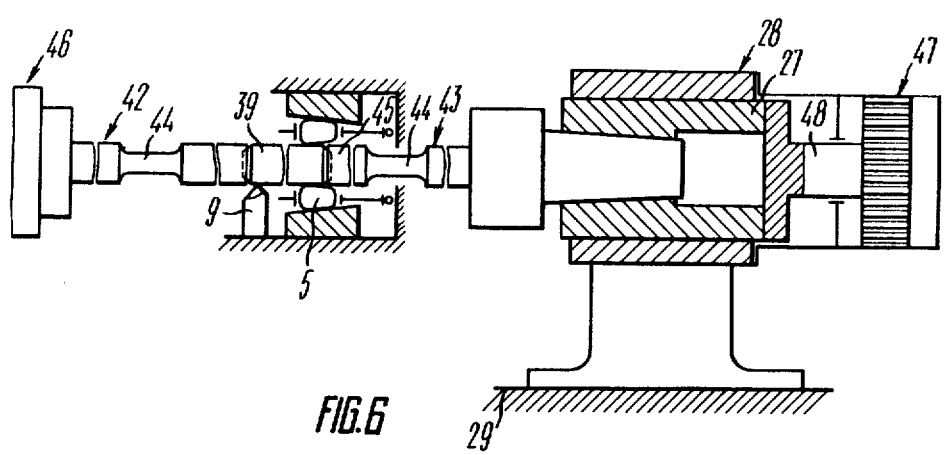
FIG. 6 is a view of the tailstock and headstock centers with low-stiffness sections.

To provide for high precision of work, a length 44 of a headstock center 42 (FIG. 6) and a similar length 44 of a tailstock center 43 are of a stiffness which is less than elsewhere. The section 44 of the tailstock center 43 is arranged behind a length 45 which is of a diameter virtually equal to the diameter at which the deforming rollers 5 are set and serves as the guide thereto. The diameter of the sections 44 is less than that of the section 45. The low-stiffness sections can be provided in another known way suitable to that end. They minimize the effect of an erroneous setting of the work at the datum surface or of a misalignment of the tailstock 28 and the headstock 46 as well as of the housing 2 integrally with the tool head 3 and the head 4 with the deforming rollers 5 relative to the spindle of the lathe.

A hydraulic cylinder 47 fitted to the tailstock 28 serves to provide a constant optimum effort for the clamping of a work 39. A movable member of the cylinder 47, its piston rod 48, is movably linked with the tailstock center 43.

The apparatus disclosed is provided with a system feeding the lubricant-coolant which is neither described nor shown in the illustrations, being outside the scope of the present invention.

The apparatus for the machining of outside cylindrical surfaces on a machine tool operates on the following lines.

On placing a standard piece of work between the headstock center 6 and the tailstock center 7, the tool 9 is fed through a given cutting depth, using the handwheel 17. The amount of travel of the tool 9 is noted on the dial gauge 18, the tool 9 is rapidly withdrawn into the inoperative position by means of the handle 15, and the standard piece of work is removed from the centers 6 and 7. The housing 2 with the heads 3 and 4 is moved back into the initial position, and a work 8 is placed between the headstock center 6 and the tailstock center 7, being then clamped by the constant effort due to the pressure in the bore of the hydraulic cylinder 47. The deforming rollers 5 are set so as to provide for a given turning diameter of the work 8 by rotating the nut 23 which displaces the cage 19. As a result, the deforming rollers contact the cylindrical portion 31 of the tailstock center 7 whose diameter is virtually equal to the diameter at which the rollers 5 are set. The tool 9 is in a position between the end face of the work 8 and the contiguous end of the tailstock center 7. Upon setting the tool 9 into the cutting position by means of the handle 15, the work is set rotating, the system feeding the lubricant-coolant is set into operation, and so is the drive of the length feed. The tool 9 starts cutting, and the deforming rollers 5 begin to move around the guide surface of the tailstock center 7, functioning as a follow-rest system which prevents chattering and ensures precision turning. When the housing 2 has travelled through a distance equal to that between the point of the tool 9 and the apexes of the deforming rollers 5, these come up to the work 8 and begin the operation of plastic deforming thereof at a given pressure (interference) without ceasing to function as the follow rest. At the end of the pass, the tool 9 is rapidly withdrawn into the inoperative position, using the handle 15, whereas the deforming rollers 5 proceed with their job to the end of the pass where the supporting cone 20 moves them apart, clearing of the setting. The length feed and spindle drive are brought then at rest, the feed of the lubricant-coolant is discontinued, and the housing is returned into the original position together with the heads 3 and 4, the deforming rollers staying clear of the work 8. The work is removed from the machine tool.

A pilot model of the apparatus provided in accordance with the present invention and fitted to a universal lathe has been used to turn steel shafts in a single pass to quality requirements between IT6 and IT17. The degree of surface roughness has varied between 0.1 and 0.16 microns.

What is claimed is:

1. An apparatus for the machining of cylindrical surfaces on machine tools having a frame, a headstock with a main motion drive installed on said frame, a tailstock installed on said frame, a carriage installed on said frame and a means of displacing said carriage in the longitudinal direction, said apparatus comprising a housing installed on said carriage; a tool head fitted to said housing; at least one tool secured in said tool head; a head with deforming rollers spaced equidistantly apart in a circumferential direction, said head being fitted to said housing behind said tool head, as viewed in the direction of length feed; a headstock center fitting into said headstock; a tailstock center fitting into said tailstock; said headstock and tailstock centers supporting work placed therebetween; said tailstock center having a first portion thereof contiguous face to face with the work during machining and a second porton serving as a guide for said deforming rollers provided with a diameter virtually equal to the diameter at which said deforming rollers are set; an end of said first portion being adapted at the side contiguous with the work to accommodate the point of the tool in a position preparatory to machining.

2. An apparatus as claimed in claim 1, wherein the tailstock center is shaped cylindrically, at least within the second portion serving as the guide for the deforming rollers, and is provided with an axial blind bore and wherein the apparatus further comprises a spring-loaded cone contained within said bore.

3. An apparatus as claimed in claim 1, wherein the tailstock center is provided, at least within the second portion serving as the guide for the deforming rollers, with a spring-loaded cylindrical sleeve and wherein a centering cone is contained in said sleeve.

4. An apparatus as claimed in claim 1, wherein that end of the tailstock centre which is contiguous with the end face of the work is provided with a chamfer at its outside diameter to accommodate the point of the tool in a position preparatory to machining.

5. An apparatus as claimed in claim 1, wherein that end of the tailstock centre which is contiguous with the end face of the work is provided with an annular groove not wider than three millimeters to accommodate the point of the tool in a position preparatory to machining.

6. An apparatus as claimed in claim 1, wherein the tailstock centre is provided with a rearward converging taper and its end contiguous in operation with the end face of the work is provided with either an annular groove not wider than three millimeters or a chamfer to accommodate the point of the tool.

7. An apparatus as claimed in claim 2, wherein that end of the cylindrical portion of the tailstock center which is contiguous with the end face of the work is provided with a rearward converging taper.

8. An apparatus as claimed in claim 3, wherein that end of the cylindrical sleeve which is contiguous with the end face of the work is provided with a rearward converging taper.

9. An apparatus as claimed in claim 1, wherein a second portion of both the headstock and tailstock center is of a stiffness less than elsewhere, the low-stiffness length of the tailstock centre being located behind the length serving as the guide for the deforming rollers.

10. An apparatus as claimed in claim 1, which is provided with a hydraulic cylinder having a movable member movably linked with the tailstock center to impart axial motion thereto.

* * * * *